US 6,663,178 B2

(12) United States Patent
Fourrey et al.

(10) Patent No.: US 6,663,178 B2
(45) Date of Patent: Dec. 16, 2003

(54) SEAT PAN PRODUCING A MASSAGING EFFECT, IN PARTICULAR FOR AUTOMOBILE VEHICLE

(75) Inventors: François Fourrey, Corquilleroy (FR); Laurent Liaigre, Combs la Ville (FR)

(73) Assignee: Faurecia Sieges d'Automobile, Boulogne (FR)

( * ) Notice: Subject to any disclaimer, the term of this patent is extended or adjusted under 35 U.S.C. 154(b) by 0 days.

(21) Appl. No.: 09/842,218

(22) Filed: Apr. 26, 2001

(65) Prior Publication Data

US 2002/0003366 A1 Jan. 10, 2002

(30) Foreign Application Priority Data

Apr. 27, 2000 (FR) .............................. 00 05557

(51) Int. Cl.⁷ ................................. A47C 3/025
(52) U.S. Cl. ............... 297/284.3; 297/337; 297/452.55; 297/452.52; 601/59; 601/98
(58) Field of Search ............ 297/284.1, 284.2, 297/284.3, 284.5, 452.55, 452.48, 452.49, 452.54, 344.1, 344.11, 311, 312, 316, 329, 337, 344.12, 344.13, 344.14, 344.17, 340, 217.3; 248/421, 422, 291.1; 5/933, 935, 722

(56) References Cited

U.S. PATENT DOCUMENTS

| | | | | |
|---|---|---|---|---|
| 2,641,252 A | * | 6/1953 | Hemming | |
| 3,390,857 A | * | 7/1968 | Nystrom | ..................... 248/564 |
| 3,752,154 A | * | 8/1973 | Clark | |
| 4,726,623 A | * | 2/1988 | Kazaoka et al. | ........ 297/452.55 |
| 4,773,703 A | * | 9/1988 | Krugener et al. | ........ 297/337 X |
| 4,781,353 A | * | 11/1988 | Nishino | ....................... 297/311 |
| 5,022,385 A | | 6/1991 | Harza | |
| 5,029,939 A | * | 7/1991 | Smith et al. | .............. 297/284.1 |
| 5,127,708 A | | 7/1992 | Kishi et al. | |
| 5,320,409 A | | 6/1994 | Katoh et al. | |
| 5,520,438 A | * | 5/1996 | Stulik | ..................... 297/284.11 |
| 5,520,614 A | * | 5/1996 | McNamara et al. | |
| 5,688,228 A | * | 11/1997 | Lin et al. | |
| 5,792,080 A | * | 8/1998 | Ookawa et al. | .............. 601/115 |
| 5,839,782 A | * | 11/1998 | Kashiwamura et al. | ..... 297/337 |
| 5,913,568 A | | 6/1999 | Brightbill et al. | |
| 5,971,944 A | * | 10/1999 | Chang | |
| 6,042,145 A | * | 3/2000 | Mitschelen et al. | .......... 280/735 |
| 6,092,249 A | * | 7/2000 | Kamen et al. | .................. 5/653 |
| 6,283,928 B1 | * | 9/2001 | Wang | |
| 6,412,874 B1 | * | 7/2002 | Mayer | .................... 297/452.52 |

FOREIGN PATENT DOCUMENTS

DE 19943890 * 9/1999
JP 2002-353039 * 12/2001

* cited by examiner

Primary Examiner—Peter M. Cuomo
Assistant Examiner—Stephen Vu
(74) Attorney, Agent, or Firm—Connolly Bove; Lodge & Hutz LLP

(57) ABSTRACT

A seat pan for an automobile vehicle includes a frame carrying a suspension lattice having two sections separated by a vertical median plane dividing the seat into right and left hand sides. A motor and crankshaft combination is connected to each section of the lattice for generating in each section of the lattice a cyclic movement including, in the upper portion of its travel, a rearward movement of translation. The cyclic movements of the sections occur with an angular phase difference therebetween.

11 Claims, 4 Drawing Sheets

SEAT PAN PRODUCING A MASSAGING EFFECT, IN PARTICULAR FOR AUTOMOBILE VEHICLE

FIELD OF THE INVENTION

This invention concerns primarily but not exclusively the seats of automobile vehicle, and in this case more specifically front seats whose seat pan includes means for producing a massaging effect on the occupant.

BACKGROUND OF THE INVENTION

We already know of seats featuring mechanisms in the seat pan that create vertical, transverse or longitudinal vibrations or oscillations, with the aim of transmitting these movements to the user through the seat pan padding to produce a massaging effect.

These mechanisms more specifically meet the already stated desire to create upward subcutaneous massaging under the thighs to prevent the sensation of "pins and needles" that can arise when driving for long periods.

Furthermore, the need to maintain a good posture of the lower vertebrae is generally well known, as are the benefits of maintaining micro-movements of the vertebral column.

The known mechanisms satisfy these desires at least in part, but none of them can correct a poor initial posture, or one that is acquired gradually, for example by the pelvis sliding forwards.

BRIEF DESCRIPTION OF THE INVENTION

The aim of this invention is to solve this problem and more specifically to bring the user's pelvis back into the correct position, either on demand or more or less automatically, while at the same time creating an additional alternating upward massaging effect under the thighs and small movements of the lower part of the vertebral column.

With these objectives in mind, the subject of the invention is an automobile vehicle seat pan containing a reinforcing frame carrying a suspension lattice and means for creating oscillatory movements in the seat pan, characterized in that the suspension lattice is made in two sections separated along a median vertical plane dividing the seat into a right-hand (RH) side and a left-hand (LH) side, each section of the lattice being linked to specific means for generating a cyclic movement including, in an upper portion of its travel, a rearward movement of translation, and in that it includes control means for generating the said movements with an angular phase difference between the two sections.

The rearward movement of each part of the lattice when in the upper position has the corresponding effect of pushing the zone around the ischium, that is to say the buttock that rests on the said part of the lattice, rearwards i.e. towards the seat back. This effect is all the more marked that when one of the buttocks is thus raised and pushed rearward by the movement of the part of the lattice situated on the same side, the load is taken off the other buttock, facilitating the forward return movement of the second part of the lattice, which is then in the lower position.

In seats in which the supporting lattice is covered by padding, the padding is also in two parts corresponding to the respective sections of the lattice, the movement of which causes a similar movement in the part of the padding that it supports.

Globally, each ischium is therefore subjected cyclically to a rearward force, while the other is subjected to a much lower force in the forward direction or even no force at all. This therefore results in the gradual repositioning of the lower part of the pelvis, accompanied by a slight lateral swaying of the pelvis, creating the desired micro-movements of the vertical column mentioned earlier. An alternating massaging effect beneath the thighs and directed towards the top of the thighs, takes place at the same time.

The amplitude of the movement is of course limited to avoid creating excessive lateral swaying of the pelvis.

Preferentially, the cyclic movement is a movement of translation that is more or less circular around a horizontal transverse axis common to the means of generating the said movement in each section of the lattice, the direction of rotation being such that during the upper portion of the travel, the movement is towards the rear.

Also preferentially, to obtain the desired movement of each section of the lattice, each of the two sections can be elastically deformed in the longitudinal direction, with the two sections of the lattice being attached at the front to the same line which is fixed with respect to the reinforcing frame, and at the rear to crankshafts that are rotated in such a way as to maintain an angular phase difference of 180° during the movement.

When stopped, the two crankshafts, or other means of generating the circular movement, are maintained in the same angular position, that is to say in the same position of the cycle, so that the left-hand section and right-hand section of the lattices are in the same plane and in the forward position, with the whole of the seat pan then being at the same level Practically, when the cyclic movement is stopped, in particular when the user leaves the seat, the movement of each part of the lattice stops when it reaches more or less the maximum forward position, with one of the two half-lattices reaching this position half a cycle after the other.

Thus, when the seat is empty, the two sections of the lattice are in this forward position. According to a preferential arrangement, the seat pan features means for initiating a preliminary positioning phase when a passenger occupies the seat again. In this phase, the two sections of the seat pan are driven simultaneously rearwards to move the user's posterior backwards with the aim of facilitating from the outset the adoption of a good posture, especially of the vertebral column, by pushing the entire pelvis towards the seat back. From this position of simultaneous backward movement of the two sections of the seat pan, the cyclic out-of-phase movement can be started again, either automatically or on demand, with the movement of one of the two sections starting half a cycle behind the other section.

The crankshafts can be driven by independent motors slaved to maintain the said angular phase difference in the movement.

The crankshafts can also be driven by a single motor, in which case the two crankshafts are linked in rotation, for example by an angular travel stop system that ensures the said 180° angular phase difference during rotation in one direction, but also enables this phase difference to be eliminated by rotation of the motor in the opposite direction to return to the rest position indicated above when stopped.

Typically, when the lattice is covered by padding, each half-lattice is formed of metal wires bent in a zigzag or alternating hairpin arrangement in the plane of the lattice, conferring the desired elasticity upon it. The front ends of these wires are all attached to a fixed element of the reinforcing frame, on which they can pivot slightly more or less around a common axis. As the rear ends of the lattice wires are pivot-mounted on the crank of a crankshaft, its rotation causes a corresponding circular displacement of the rear ends of the half-lattices, which is transmitted along the whole of each half-lattice thanks to their elasticity, although it reduces gradually towards the front of the half-lattice because the front is fixed.

Preferentially, when the seat pan includes padding that covers the lattice, each section of the padding, conventionally made of polyurethane foam, for example, features transverse slits that increase the deformation capacity of each half-padding, to better follow the cyclic elongations of the half-lattices on which they rest.

Also preferentially the seat pan can include an external covering that ensures greater adherence when it moves rearwards than when it moves forwards. Such a covering, typically of a seal-skin or fish-scale type material, ensures better adherence of the seat pan under the occupant's posterior during the rearward movement, and favors sliding during the forward movement.

To automate operation, the seat pan preferentially features pressure sensors under the seat pan surface to measure the pressure exerted by the occupant's buttocks.

As the pressure sensors are positioned such that they can measure the pressure exerted on the seat pan surface at a minimum of two points situated one in front of the other; they can then control automatic stopping of the crankshaft driving motor(s) when the measured pressure, or the pressure differential between a sensor situated the furthest to the rear and another sensor situated further forward, reaches a predetermined threshold indicating that the weight of the seat occupant is once again distributed on the seat in a configuration of optimum comfort. Similarly, the sensors can cause automatic activation of the system if they detect that the area of highest pressure has moved abnormally towards the front of the seat, and also initiate automatic starting of the preliminary positioning phase when they detect the arrival of an occupant, or automatic moving of the two sections of the lattice to the forward position when they detect departure of the occupant.

To fulfill these automatic functions, the seat may be equipped with means for storing the values of the pressure or of a pressure differential, and means for comparing the values measured by the sensors with the stored values, for different users for example.

Other characteristics and advantages of the invention will appear in the following description of an automobile vehicle seat in compliance with the invention.

BRIEF DESCRIPTION OF THE FIGURES

Refer to the appended drawings in which.

DETAILED DESCRIPTION OF THE INVENTION

Figure 1:
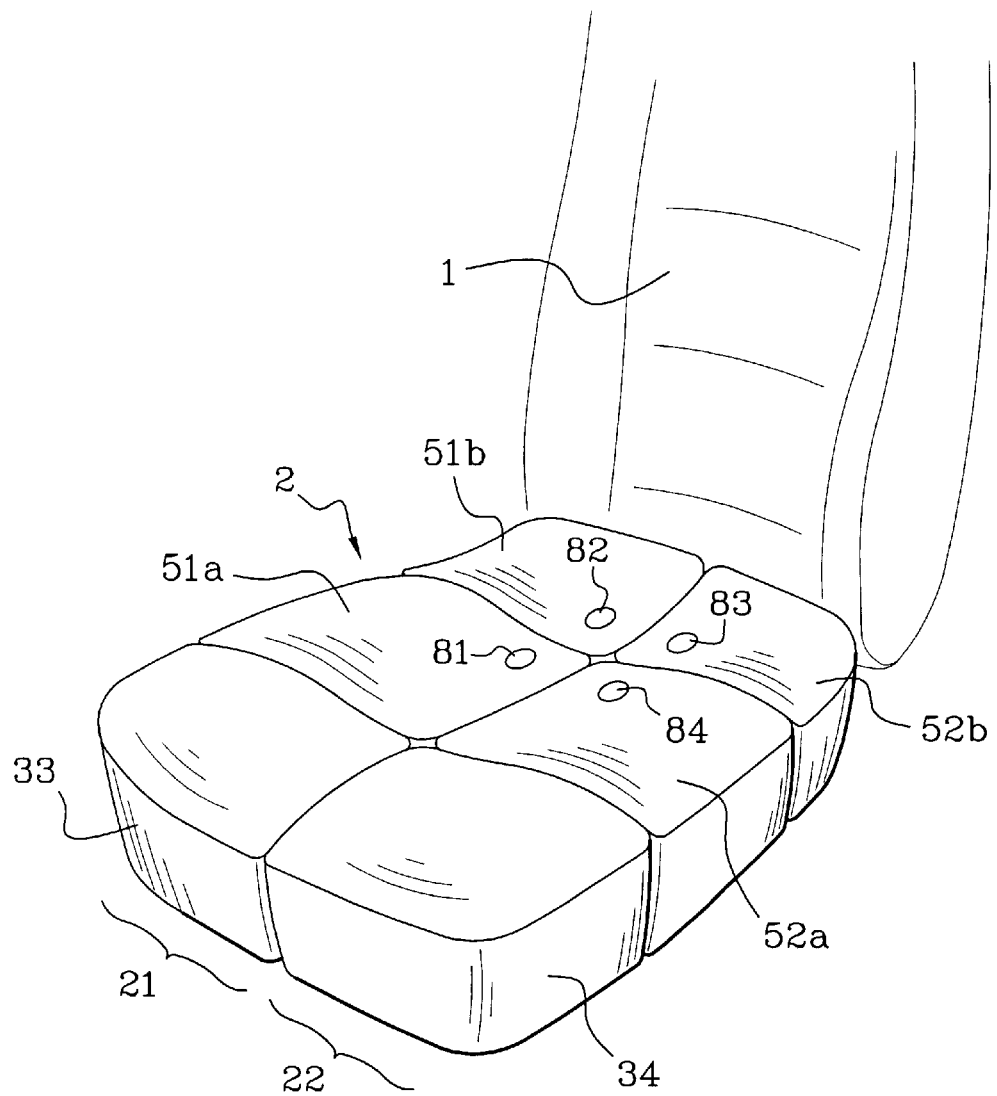
FIG. 1 is a partial perspective view of a seat in compliance with the invention, featuring a suspension lattice supporting the padding.

The seat illustrated in FIG. 1 comprises a backrest 1 and a seat pan 2 of which the visible part is made up of two sections, a RH half seat pan 21 and a LH half seat pan 22, separated by a median longitudinal vertical plane P.

Figure 2:
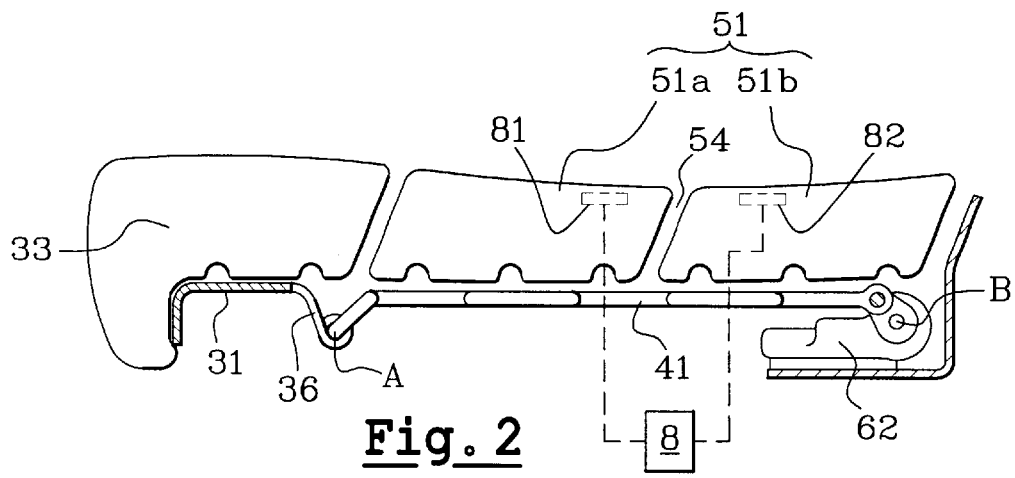
FIG. 2 is a longitudinal sectional view of the seat pan.
Figure 3:
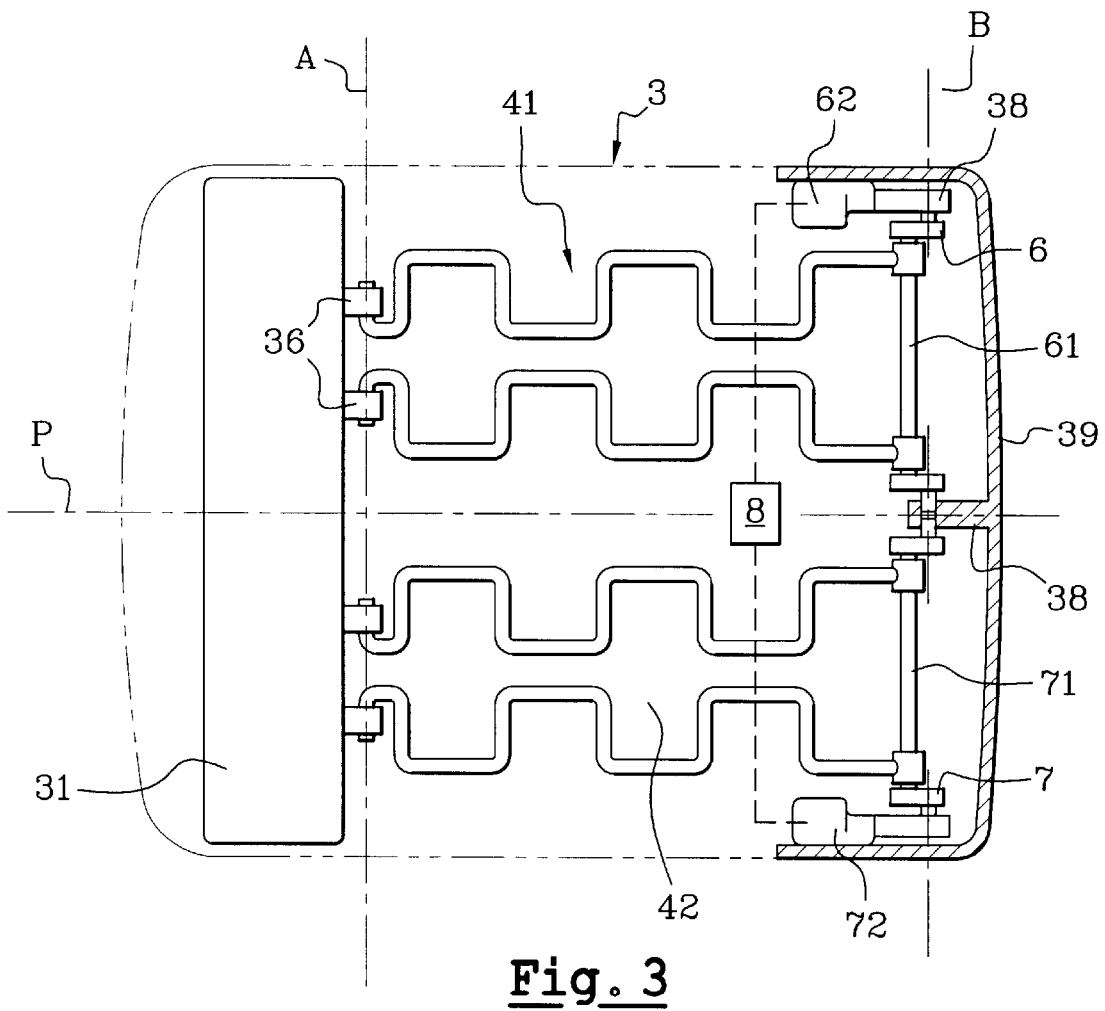
FIG. 3 is a top view of the suspension half-lattices, with the system in the rest position.

The seat pan includes a reinforcing frame 3, illustrated schematically in FIGS. 2 and 3, the front of which carries a plate 31 supporting a seat pan front edge 32. The seat pan front edge includes two padding elements 33, 34.

The rest of the seat pan between the front and the backrest features a suspension lattice made up of two half-lattices 41, 42, each half-lattice supporting a half padding 51, 52 respectively, each half-padding itself being preferentially made up of several padding elements, namely two elements 51a, 51b; 52a, 52b in the example shown in the figures.

Each half-lattice is made up of a set of wires folded in alternating castellations to confer upon the lattice, in a manner known itself, a capacity for elastic deformation. The front of each half-lattice is linked to attaching lugs 36 that are attached to the frame, for example linked to the seat pan front edge support plate 31. The connection between the front of the half-lattices and the frame is such that the two half-lattices are hinged as it were with respect to the said frame, around a common axis A.

The rear of each half-lattice is pivot-mounted on a crank 61, 71 of a crankshaft 6, 7. Each crankshaft 6, 7 is mounted to rotate in journal bearings 38 fixed to a rear part 39 of the reinforcing frame, and rotated by a specific motor 62, 72, around a common axis of rotation The padding elements 51a, 51b of a given half-padding can be independent, separated by transverse slits 54 extending through their entire thickness, as shown in FIG. 2, or interlinked with transverse slits that only extend through part of their thickness, insofar as the padding material is sufficiently supple to accept cyclic elongations without becoming damaged. Similarly, padding elements 51a, 52a could also be linked to the padding 33, 34 of the seat pan front edge.

The seat pan also incorporates pressure sensors 81 to 84 for measuring the pressure exerted at different points by the posterior 9 of the occupant. As shown in FIG. 1, a sensor can be placed in each padding element. The sensors are linked for example to monitoring means 8 featuring means for storing the values of the pressure or a pressure differential, means for comparing the values measured by the sensors with the stored values, and means for controlling and slaving the motors 62, 72.

In the rest position, that is to say when motors 62, 72 stop, their cranks are immobilized in the same angular position as shown in FIG. 3.

When the pressure sensors detect a forward movement of the user's pelvis, the monitoring unit starts the motors to firstly produce an angular phase difference of 180°, and then continue rotation while maintaining this phase difference. The resulting movement of each half seat pan is shown in FIGS. 4a to 4d, showing the RH section of the seat pan as an example, given that the LH section moves in an identical fashion, but offset in time by a period corresponding to a half-turn of the crankshafts.

Figure 4A:
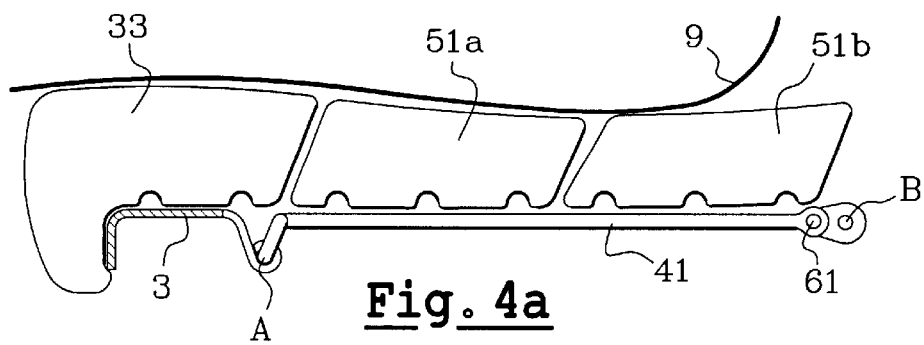
FIGS. 4a to 4d illustrate the movement of a half-lattice during an operating cycle.
Figure 4B:
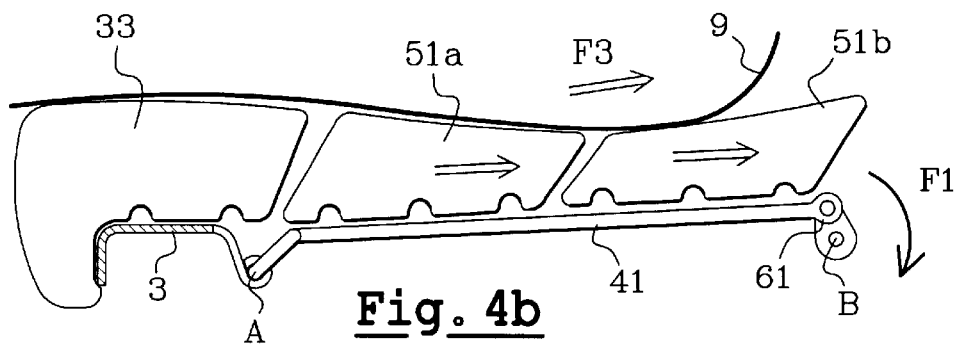

Starting from the position illustrated in FIG. 4a, crankshaft 6 rotating in the direction of the arrow F1 lifts the half-lattice 41 situated on the RH side and displaces its rear anchoring point rearwards, elastically extending the half-lattice. In following this movement, the padding raises the RH side of the posterior, increases the pressure beneath it and moves it rearwards in the direction of arrow F3, while simultaneously the pressure is released on the LH side where the half-lattice is lowered and can therefore contract with a forward movement, without tending to displace the LH side of the occupant's posterior.

Figure 4C:
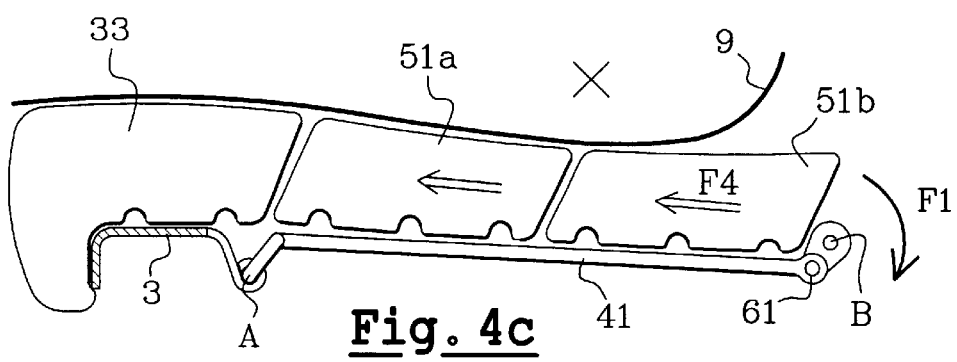

The movement continues as shown in FIG. 4c by a lowering of the half-lattice after reaching the point of maximum elongation, and a forward movement in the direction of arrows F4, leaving the RH side of the posterior more or less immobile or with a small forward movement, while the LH side makes the upward and rearward movement indicated above, moving the RH side of the posterior rearwards.

Figure 4D:
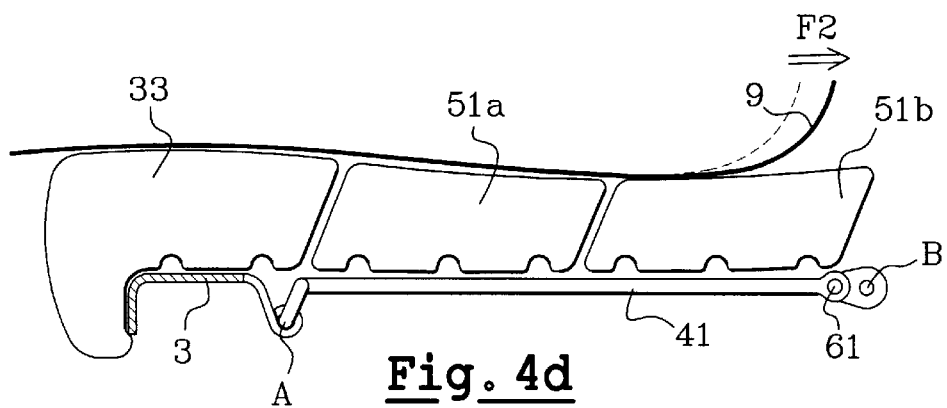
Figure 5:
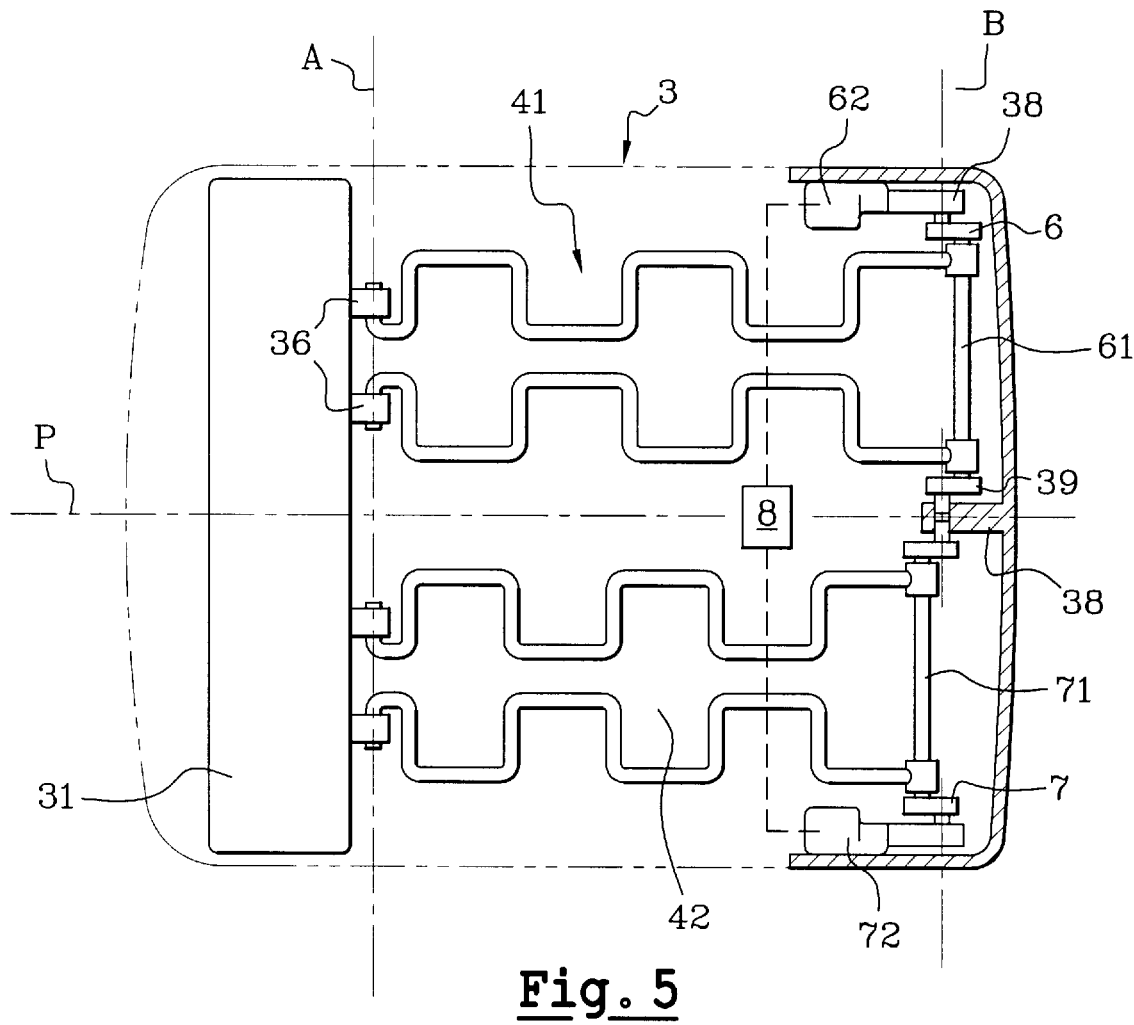
FIG. 5 is a top view of the suspension half-lattices showing the phase difference between the two crankshafts during system operation.

The cyclic combination of the movements of the two sections of the seat pan results in the overall rearward movement of the pelvis illustrated by the arrow F2 in FIG. 4d, and a slight left-right swinging motion and an upward massaging effect under the thighs.

The motors are stopped and returned to the rest position as soon as the pressure sensors signal to the monitoring unit that the equilibrium between the pressures detected by the various sensors has been restored.

When the pressure sensors detect that the seat is no longer occupied, they command the returning of the crankshafts to the rest position, towards the front of the seat. When they once again detect the presence of an occupant, they command a half-cycle that brings the two sections of the seat pan simultaneously rearwards, to move the occupant into the best postural position, as indicated earlier.

The invention is not limited to the mode of operation described above uniquely by way of example. More specifically:

- other modes of operation may be used for the suspension half-lattices, as is known, insofar as they have a sufficient capacity for elastic deformation.
- the shapes, number and relative positions of the padding elements may also be modified according to the other seat manufacturing constraints.
- the suspension lattice may also be produced in the form of elastically deformable netting, made in either two parts or a single piece, but in the latter case having a deformation capacity that allows the individual movements of each half-lattice. This netting could in itself constitute the seat pan surface without being covered by padding.
- control means other than the rotary crankshafts described earlier could also be used, such as a system of driven actuators that perform the displacement cycles in accordance with the invention.

What is claimed is:

1. A seat pan, for an automobile vehicle, comprising:
   a frame carrying a suspension lattice having two sections separated by a vertical median plane dividing a seat into right and left hand sides;
   means connected to each of the sectors of the lattice for generating in each of the sectors of the lattice a cyclic movement including, in an upper portion of its travel, a rearward movement of translation;
   control means for generating said movement with an angular phase difference between the two sections; and
   pressure sensors being positioned under the surface of the seat pan such that they can measure the pressure exerted on the seat pan surface at a minimum of two points situated one in front of the other.

2. The seat pan in accordance with claim 1, further comprising means selectively storing pressure parameter values, and means of comparing the values measured by the sensors with the stored values.

3. A seat pan, for an automobile vehicle, comprising:
   a frame carrying a suspension lattice having two sections separated by a vertical median plane dividing the seat into right and left hand sides;
   means connected to each of the sections of the lattice for generating in each of the sections of the lattice a cyclic movement including, in an upper portion of its travel, a rearward movement of translation; and
   control means for generating said movement with an angular phase difference between the two sections.

4. The seat pan in accordance with claim 3, wherein the cyclic movement is substantially circular movement of translation around a horizontal transverse axis common to the means of generating the movement in each of the sections of the lattice, with the direction of rotation being such that during an upper portion of the travel, the displacement is in the rearward direction.

5. The seat pan in accordance with claim 3, wherein each of the sections of the lattice is elastically deformable in the longitudinal direction, the two sections of the lattice being attached at the from of the lattice and aligned along a line that is spacially fixed with respect to the reinforcing frame, the two sections being fixed at the rear of a pair of crankshafts for rotation such that an angular phase difference of 180° is maintained by the respective cyclic movements of the sections.

6. The seat pan in accordance with claim 5, wherein the crankshafts are driven by independent motors slaved to maintain said angular phase difference during the movement.

7. The seat pan in accordance with claim 3, wherein the means for generating the cyclic movement, when stopped, are maintained in the same angular position so that the left and right hand sections of the lattice sections lay in the same plane and are positioned in a forward position.

8. The seat pan in accordance with claim 7, further comprising means for initiating a preliminary positioning phase when a passenger gets into the seat, during which time the two sections of the seat are driven simultaneously rearwards.

9. The seat pan in accordance with claim 3, further comprising padding in two parts, each of the parts covering each of the sections of the lattice, and each of the parts of the padding including transverse slits.

10. The seat pan in accordance with claim 3, further comprising an external covering that offers greater adherence when moving rearwardly than when moving forwardly.

11. The seat pan in accordance with claim 3, further comprising pressure sensors under the surface of the seat pan.

* * * * *

UNITED STATES PATENT AND TRADEMARK OFFICE
CERTIFICATE OF CORRECTION

PATENT NO. : 6,663,178 B2
DATED : December 16, 2003
INVENTOR(S) : Francois Fourrey et al.

It is certified that error appears in the above-identified patent and that said Letters Patent is hereby corrected as shown below:

Column 5,
Lines 51 and 52, replace "sectors" with -- sections --.

Column 6,
Line 27, replace "from" with -- front --.

Signed and Sealed this

Thirteenth Day of July, 2004

JON W. DUDAS
*Acting Director of the United States Patent and Trademark Office*